July 8, 1947. W. H. BARLOW 2,423,432
METHOD OF MAKING COMPOSITE METAL COUPLING MEMBERS
Original Filed Sept. 24, 1941
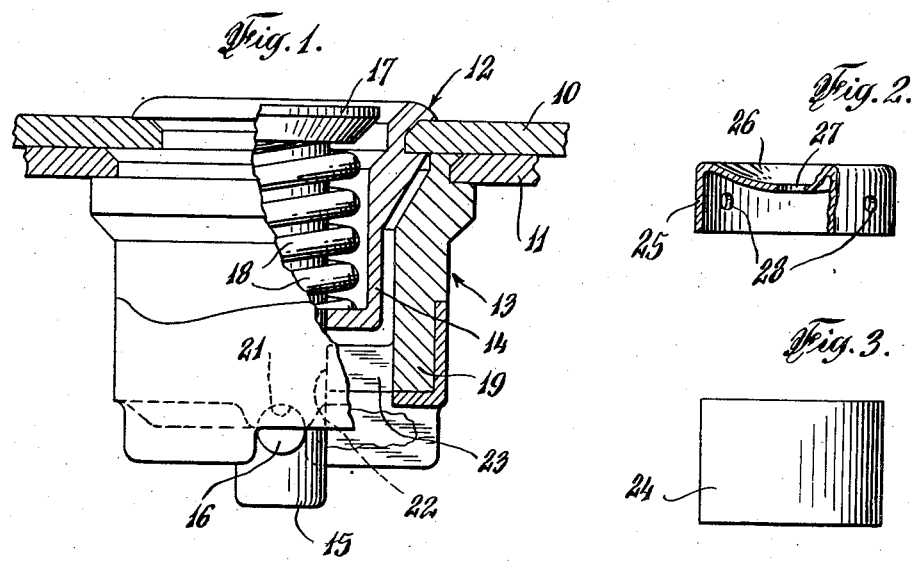
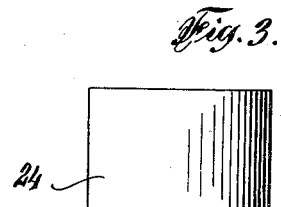
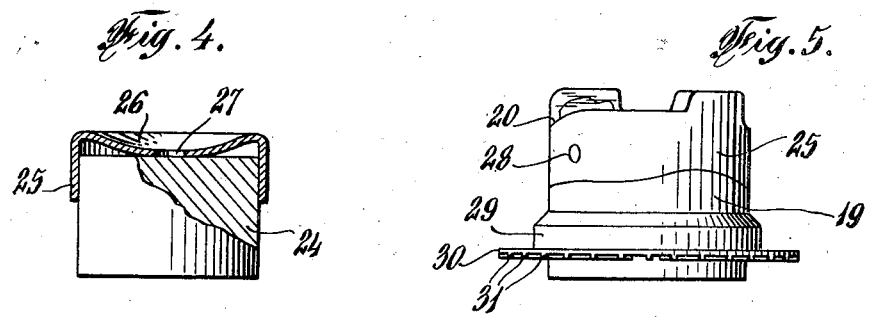
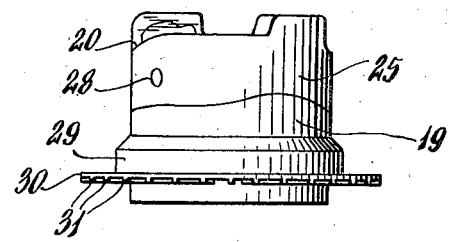
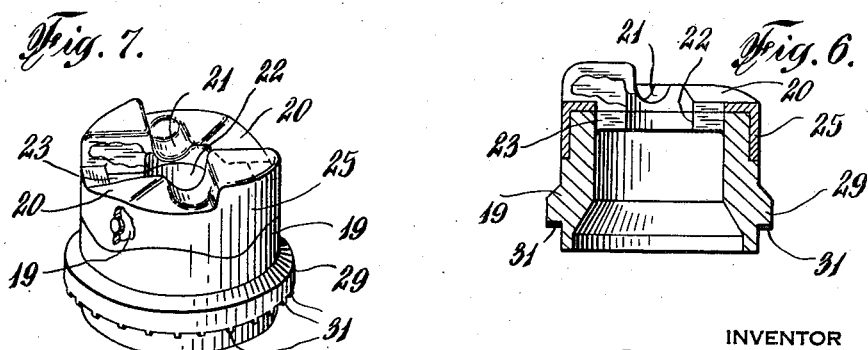
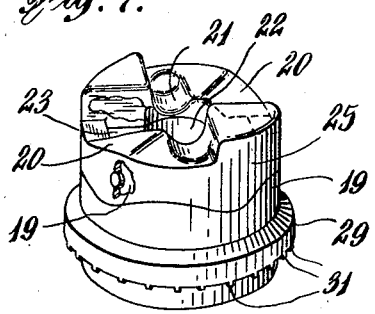
INVENTOR
William H. Barlow
BY
Fraser, Myers & Manley
ATTORNEYS Patented July 8, 1947

2,423,432

UNITED STATES PATENT OFFICE 2,423,432

METHOD OF MAKING COMPOSITE METAL COUPLING MEMBERS

William H. Barlow, Waterbury, Conn., assignor to Scovill Manufacturing Company, Waterbury, Conn., a corporation of Connecticut Original application September 24, 1941, Serial No. 412,064, now Patent No. 2,368,799, dated February 6, 1945. Divided and this application July 15, 1943, Serial No. 494,803

6 Claims. (Cl. 29—148)

This application is a division of my application Serial No. 412,064, filed September 24, 1941, now Patent No. 2,368,799.

My present invention relates to the method of making couplings of the turn-button or bayonet type which are susceptible of general application and have found considerable use for detachably fastening aircraft cowling and inspection plates which must be made readily removable. Where used in securing aircraft cowling the coupling members should be as lightweight as possible and hence they have been made of aluminum or of an aluminum or magnesium base alloy. When made of such metals, however, which, because of the relative softness thereof and the considerable vibration to which they are subjected in use, the wear thereon is great and the useful life thereof is materially lessened.

The present invention accordingly has for its primary object the method of making a coupling of the general type set forth wherein the essential property of lightness will be preserved and the objectionable property of short life will be overcome. I accomplish this by making the coupling members basically of lightweight metal and making the parts thereof which are subjected to wear, of a hard wear-resisting metal. Where a coupling member is made to consist in part of lightweight metal and in part of a hard wear-resisting metal, I propose to make such member of composite metal by so forming and uniting against separation the wear-resisting metal to the lightweight metal backing portion and thereby produce in a simple and economical manner a coupling member having the desirable properties set forth.

The invention will be better understood from the detailed description which follows, when considered in connection with the accompanying drawings showing a preferred embodiment and wherein—

Figure 1 shows in elevation, with parts broken away, a coupling member of a type to which the present invention is applicable.

Fig. 2 is a view partly in elevation and partly in section of one of the parts used in making a coupling according to the present invention.

Fig. 3 shows a side elevation of a cylindrical slug or blank used in making a coupling member according to the present invention.

Fig. 4 is a view, partly in elevation and partly in section, of the first step in the assembly of the elements shown in Figs. 2 and 3 in the making of a coupling member according to the present invention.

Fig. 5 shows in side elevation an intermediate stage of the coupling member in the course of its manufacture.

Fig. 6 shows a diametrical section of the coupling member of Fig. 5 after being further acted upon.

Fig. 7 shows a perspective view, with a portion broken away to better show a detail of a finished coupling member embodying the present invention.

Referring to the drawings, the reference characters 10 and 11 indicate a pair of plates each having an opening within which is fixedly mounted in any desired manner a coupling member 12 and 13, respectively, through the medium of which the plates 10 and 11 may be rapidly detachably connected together. In this connection it may be mentioned that the plate 10 may be a cowling for an airplane engine or the like, and the plate 11 a support or framework within which such engine or the like is mounted.

The coupling members 12 and 13 constitute a turn-button or bayonet type of coupling and may be of any desired detailed construction. Such coupling members, however, usually consist of a male member and a female member having cooperating locking means and spring-tensioning means for holding the parts in assembled relation. As herein shown, the member 12 is the male coupling member and consists generally of a cylindrical housing 14, the inner end of which has a central opening through which extends a stud 15, the end thereof which extends through the housing 14 being provided with a crosspin 16 rigidly affixed thereto. The opposite end of the stud is formed with an enlarged head 17 provided with means (not shown) for engagement by a tool whereby the stud may be turned about its axis. Between the enlarged head 17 and the inner end of the cylindrical housing 14 is coil-spring 18 surrounding the stud 15 and normally urging the head 17 thereof outwardly with respect to the housing. The member 13 which is the female coupling member likewise consists of a substantially cylindrical housing or socket member 19 formed adjacent its inner end with opposed cam tracks 20 which terminate adjacent the highest points of the cams in detents 21. Said socket member 19 also has at its inner end a central opening 22 and a diametrical slot 23 disposed at an angle to the line joining the detents 21 and adapted to permit the insertion through the socket member of the stud 15 with its crosspin 16.

A coupling of the general type hereinabove described is old in the art, and the present invention is primarily directed to coupling members of said general form which shall be exceedingly light in weight while having its surfaces which are subjected to wear, formed of a hard wear-resisting metal. The present invention primarily contemplates the method of making such coupling member of composite metal in a simple, expeditious, economical and practicable manner.

In a coupling as herein shown, it will be appreciated that the cam surfaces 20 and the surfaces of the detents 21 on the cylindrical housing or socket member 19 will be subjected to considerable wear and vibration in use and hence it is proposed to make that portion of the socket member 19 which contains the cam tracks and detents from a hard wear-resisting metal such as steel, while the remainder or backing portion of said socket member may be made of lightweight metal such as aluminum or an aluminum or magnesium base alloy.

To make the coupling member 13 of composite metal having the desirable properties of lightness in weight and wear-resistance at the surfaces subjected to wear, I preferably start with a cylindrical blank or slug 24 of aluminum or an aluminum or magnesium base alloy and position over one end thereof, as shown in Fig. 4, a shallow, substantially cylindrical thin cup 25 of a hard wear-resisting metal such as steel, the cylindrical wall of which is of a size to fit over said blank 24. The base of said cup is preferably dished inwardly, as shown at 26, and is formed with a central opening 27, and the side wall of said cup is formed with one or more openings 28, for purposes which will be presently explained.

The assembly as shown in Fig. 4 is then mounted in a suitable press provided with cooperating dies of desired configuration, and force is applied to the assembly in a direction longitudinally of the axis to simultaneously deform said parts into desired shape, with their complemental surfaces contiguous to each other to provide the composite socket or cup-shaped member with the cam surfaces 20 and detents 21. In the course of this force pressing operation the soft metal blank 24 is formed into cup shape with an enlargement 29 adjacent the base of the blank or rim of the resulting cup and the excess metal is forced outwardly adjacent said rim to form an annular fin 30 the under surface of which is preferably ribbed or serrated, as indicated at 31. In the course of subjecting these parts to the force pressing operation the softer metal of the blank 24 which is made to constitute the backing portion of the coupling member is also caused to flow into and fill the openings 28 in the cup 25, as best shown in Fig. 5. This interengagement of the soft and hard metals serves to anchor the resulting backing portion of soft metal and the resulting crown portion of hard wear-resisting metal, against displacement. The blank of Fig. 5 is then subjected to a piercing or cutting operation which provides the coupling member with the central opening 22 and the diametrical slot 23 and cuts away the annular fin 30.

In the method of forming the coupling member 19 above described, the steel cup is subjected to severe strains, hence I have found it desirable to initially form the cup with a dished base 26 in order to provide enough metal stock in that portion thereof to withstand the severe forming operation, and I have provided the central opening 27 in the cup to allow the metal of the dished portion to be deformed or distorted radially and thereby avoid too severe a strain at the outer end of the dished portion.

From an inspection of Figs. 1, 6 and 7 of the drawings it will be apparent that the cam tracks and detents of the socket member are formed in the crown portion of the member which is capped by the deformed steel cup and backed by the lightweight metal. Said cam surfaces and detents are thus able to withstand the wear and strain to which the coupling member is subjected in use. It will be further appreciated that this crown portion of steel is relatively thin and adds but little to the lightweight character of the backing portion which constitutes the major portion of the socket member.

From the foregoing detailed description it will therefore be recognized that I have disclosed a novel method of forming a coupling member having the desirable properties of lightness in weight and resistance to wear due to friction and vibration, and while I have shown and described a preferred embodiment of my invention it is to be understood that I do not wish to be limited to the details of construction and the method steps disclosed since these are only given by way of example and may be varied within the range of mechanical and engineering skill without departing from the spirit of my invention as defined by the appended claims.

What I claim is:

1. The method of making a lightweight composite metal unit having a hard wear-resisting surface from a cylindrical blank of relatively lightweight soft metal and a thin cup of relatively hard wear-resisting metal having a cylindrical wall to closely fit over one end of the blank, which method comprises, applying the thin cup over one end of the blank, mounting said metal parts in a press having cooperating dies of desired configuration and applying force to said metal parts through said dies in a direction parallel to their axes to deform at least the cylindrical blank into a cup and the composite parts into desired shape while maintaining a contiguous relation therebetween.

2. The method of making a lightweight composite metal coupling having a hard wear-resisting crown portion and a relatively lightweight soft metal backing portion, which comprises applying a thin cup formed of a hard wear-resisting metal having a cylindrical wall and a deformed base to afford a greater area of metal therein to withstand a subsequent deforming operation over one end of a substantially cylindrical blank of relatively soft lightweight metal having an external diameter to closely fit within the thin cup metal, mounting said metal parts in a press having cooperating dies of desired configuration, applying force to said metal parts through said dies in a direction parallel to their axes to simultaneously deform them into desired shape while maintaining a contiguous relation therebetween, and anchoring said parts against displacement by causing portions of said parts to interengage each other.

3. The method of making a lightweight composite metal coupling member having a hard wear-resisting crown portion with cam tracks and detents therein and a relatively lightweight soft metal backing portion for said crown portion, which method comprises, applying a thin cup formed of a hard wear-resisting metal having a centrally perforated inwardly dished bottom over one end of a substantially cylindrical blank of relatively soft lightweight metal having an external diameter to closely fit within the thin cup, mounting said metal parts in a press having cooperating dies of desired configuration and applying force to said metal parts through said dies to simultaneously deform them to provide a crown portion having cam tracks and detents while maintaining a contiguous relation between the soft and hard metal and anchoring said parts against displacement by causing a portion of the soft metal to flow under the applied force into a locking recess in the wall of the cup.

4. The method of making a light weight composite metal unit having a hard wear-resisting surface, from a cylindrical blank of relatively lightweight soft metal and a thin cup of relatively hard wear-resisting metal having a cylindrical wall adapted to fit closely over one end of the blank, which method comprises applying the thin cup over one end of the blank and having the other end of the blank projecting beyond the cup, mounting said parts in a press having cooperating dies of desired configuration and applying force to said metal parts through said dies in a direction parallel to their axes, to deform at least the cylindrical blank into cup-shaped form with its outer surface in contiguous relation to the inner surface of the hard wear-resisting cup, and provide the blank-formed cup with an outwardly-extending enlargement adjacent the rim thereof beyond the rim of the hard wear-resisting cup.

5. The method of making a light weight composite metal unit having a hard wear-resisting surface, from a cylindrical blank of relatively lightweight soft metal and a thin cup of relatively hard wear-resisting metal having a cylindrical wall adapted to fit closely over one end of the blank, which method comprises applying the thin cup over one end of the blank and having the other end of the blank projecting beyond the cup, mounting said parts in a press having cooperating dies of desired configuration, applying force to said metal parts through said dies in a direction parallel to their axes, to deform at least the cylindrical blank into cup-shaped form with its outer surface in contiguous relation to the inner surface of the hard wear-resisting cup, and provide the blank-formed cup with an outwardly-extending enlargement adjacent the rim thereof beyond the rim of the hard wear-resisting cup and then piercing the composite metal unit to provide a central opening and a diametrical slot in the base of the composite cup and trimming away part of the outwardly extending enlargement on the blank formed cup.

6. The method of making a light weight composite metal coupling member having an irregular hard wear-resisting crown portion formed with a cam surface and a detent and a relatively lightweight soft metal backing portion for said crown portion, which method comprises, applying a thin cup of a hard wear-resisting metal having a cylindrical wall over one end of a cylindrical blank of relatively soft lightweight metal having a diameter substantially equal to the interior diameter of the cup and having the other end of the blank projecting beyond the cup, mounting said parts in a press having cooperating dies of desired configuration, applying force to said metal parts through said dies in a direction parallel to their axes to simultaneously deform them into desired shape while maintaining a contiguous relation therebetween without increasing the diameter of the wear-resisting cup while increasing the outer diameter of the blank adjacent the wear-resisting cup to lie flush with the outer surface of said cup, and anchoring said parts against displacement by causing portions thereof to interengage each other.

WILLIAM H. BARLOW.

REFERENCES CITED

The following references are of record in the file of this patent:

UNITED STATES PATENTS

| Number | Name | Date |
|---|---|---|
| 2,131,319 | Greenboltz et al. | Sept. 27, 1938 |
| 2,150,524 | Starr | Mar. 14, 1939 |
| 1,334,051 | Prime | Mar. 16, 1920 |
| 1,316,877 | Clarkson | Sept. 23, 1919 |
| 2,232,973 | Rood | Feb. 25, 1941 |
| 1,854,271 | Michel | Apr. 19, 1932 |
| 2,239,125 | Summers | Apr. 22, 1941 |
| 2,102,325 | Kylstra | Dec. 14, 1937 |
| 1,748,138 | McBride | Feb. 25, 1930 |
| 2,049,265 | Kinney | July 28, 1936 |
| 1,610,569 | Maynard | Dec. 14, 1926 |

Certificate of Correction

Patent No. 2,423,432.                                                                                       July 8, 1947.

WILLIAM H. BARLOW

It is hereby certified that error appears in the printed specification of the above numbered patent requiring correction as follows: Column 4, line 57, claim 2, strike out the word "metal" first occurrence; and that the said Letters Patent should be read with this correction therein that the same may conform to the record of the case in the Patent Office.

Signed and sealed this 26th day of August, A. D. 1947.

[SEAL]

LESLIE FRAZER,
*First Assistant Commissioner of Patents.*